(12) United States Patent
Secades et al.

(10) Patent No.: US 9,474,046 B2
(45) Date of Patent: Oct. 18, 2016

(54) MODE SWITCHING USER DEVICE

(71) Applicant: QUALCOMM Incorporated, San Diego, CA (US)

(72) Inventors: Marcos Secades, Carlsbad, CA (US); Justin James, San Diego, CA (US); Charles Hudak, San Diego, CA (US); Randall G. Menna, Chicago, IL (US); Howard Rittberg, Julian, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/745,910

(22) Filed: Jun. 22, 2015

(65) Prior Publication Data

US 2015/0289230 A1 Oct. 8, 2015

Related U.S. Application Data

(63) Continuation of application No. 12/272,994, filed on Nov. 18, 2008, now Pat. No. 9,066,316.

(60) Provisional application No. 60/989,050, filed on Nov. 19, 2007.

(51) Int. Cl.
*G01R 11/00* (2006.01)
*G06F 15/00* (2006.01)
*H04J 1/16* (2006.01)
(Continued)

(52) U.S. Cl.
CPC .......... *H04W 68/12* (2013.01); *H04L 61/2007* (2013.01); *H04W 24/10* (2013.01); *H04W 80/04* (2013.01)

(58) Field of Classification Search
CPC .......................... H04W 68/02; H04W 88/185
See application file for complete search history.

(56) References Cited

U.S. PATENT DOCUMENTS 6,230,009 B1   5/2001   Holmes et al.
6,317,606 B1   11/2001  Choi et al.
(Continued)

FOREIGN PATENT DOCUMENTS

EP   0851703   7/1998
EP   0909068   4/1999
(Continued)

OTHER PUBLICATIONS

European Search Report—EP10176223, Search Authority—Munich Patent Office, Sep. 28, 2010.
(Continued)

*Primary Examiner* — Maharishi Khirodhar
(74) *Attorney, Agent, or Firm* — Satheesh Karra

(57) ABSTRACT

Techniques for monitoring radio and network conditions to improve performance for a wireless device are described. A diagnostic monitoring module may receive diagnostic messages from a modem via a diagnostic interface at the wireless device. The module may process (e.g., parse) the diagnostic messages to obtain network status information indicative of the status of a radio network. The module may provide the network status information to an application for use to control communication with the radio network. The module may also process the diagnostic messages to obtain diagnostic information indicative of the performance of a radio connection or a data session or both for the wireless device. The module may send the diagnostic information to a network server for network monitoring, debugging, etc.

20 Claims, 7 Drawing Sheets

(51) Int. Cl.
  *H04W 68/12* (2009.01)
  *H04W 24/10* (2009.01)
  *H04L 29/12* (2006.01)
  *H04W 80/04* (2009.01)

(56) References Cited

U.S. PATENT DOCUMENTS

| | | | | |
|---|---|---|---|---|
| 6,571,093 | B1* | 5/2003 | Jarrett, Jr. | H04M 15/41 370/349 |
| 6,745,011 | B1 | 6/2004 | Hendrickson et al. | |
| 6,915,128 | B1 | 7/2005 | Oh | |
| 7,472,396 | B2 | 12/2008 | Jacobs et al. | |
| 7,823,155 | B2 | 10/2010 | Misra et al. | |
| 7,843,991 | B2 | 11/2010 | Fok et al. | |
| 7,983,242 | B2 | 7/2011 | Nasielski et al. | |
| 8,682,357 | B2* | 3/2014 | Worrall | H04W 68/00 455/450 |
| 2002/0035497 | A1 | 3/2002 | Mazereeuw et al. | |
| 2004/0058651 | A1 | 3/2004 | Ross et al. | |
| 2004/0192221 | A1 | 9/2004 | Matsunaga | |
| 2004/0258011 | A1* | 12/2004 | Hiyama | H04W 60/00 370/328 |
| 2005/0277429 | A1* | 12/2005 | Laroia | H04W 68/025 455/458 |
| 2006/0234698 | A1 | 10/2006 | Fok et al. | |
| 2007/0066273 | A1 | 3/2007 | Laroia et al. | |
| 2007/0197234 | A1* | 8/2007 | Gill | H04W 68/12 455/458 |
| 2008/0305768 | A1* | 12/2008 | Nylander | H04W 12/06 455/410 |
| 2009/0135731 | A1 | 5/2009 | Secades et al. | |

FOREIGN PATENT DOCUMENTS

| | | |
|---|---|---|
| JP | H10257187 A | 9/1998 |
| JP | 2004304399 A | 10/2004 |
| JP | 2005110060 A | 4/2005 |
| JP | 2005236833 A | 9/2005 |
| JP | 2005532718 | 10/2005 |
| JP | 2007503164 A | 2/2007 |
| JP | 2007503756 A | 2/2007 |
| JP | 2007060189 A | 3/2007 |
| JP | 2008538685 A | 10/2008 |
| KR | 20070090799 A | 9/2007 |
| WO | 2004004381 A1 | 1/2004 |
| WO | 2005020620 | 3/2005 |
| WO | 2005022939 A1 | 3/2005 |
| WO | 2006105717 A1 | 10/2006 |
| WO | 2006113418 A2 | 10/2006 |
| WO | 2006116027 A1 | 11/2006 |

OTHER PUBLICATIONS

European Search Report—EP10176229, Search Authority—The Hauge Patent Office, Oct. 7, 2010.
International Search Report, PCT/US2008/084030. International Searching Authority—European Patent Office. Jan. 7, 2009.
Written Opinion of the International Searching Authority, PCT/US2008/084030. International Searching Authority—European Patent Office. Jan. 7, 2009.

* cited by examiner

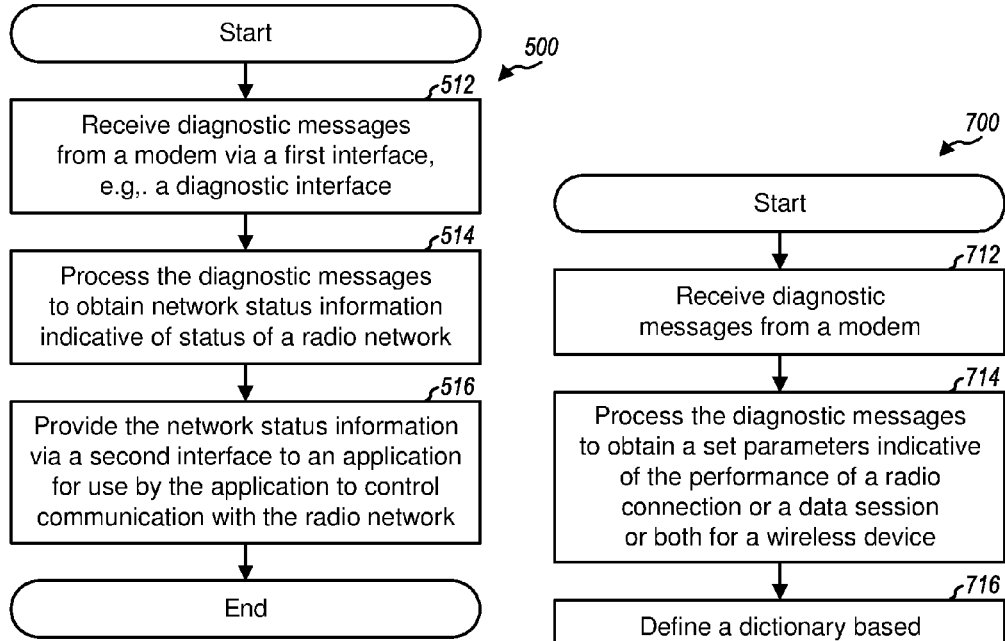
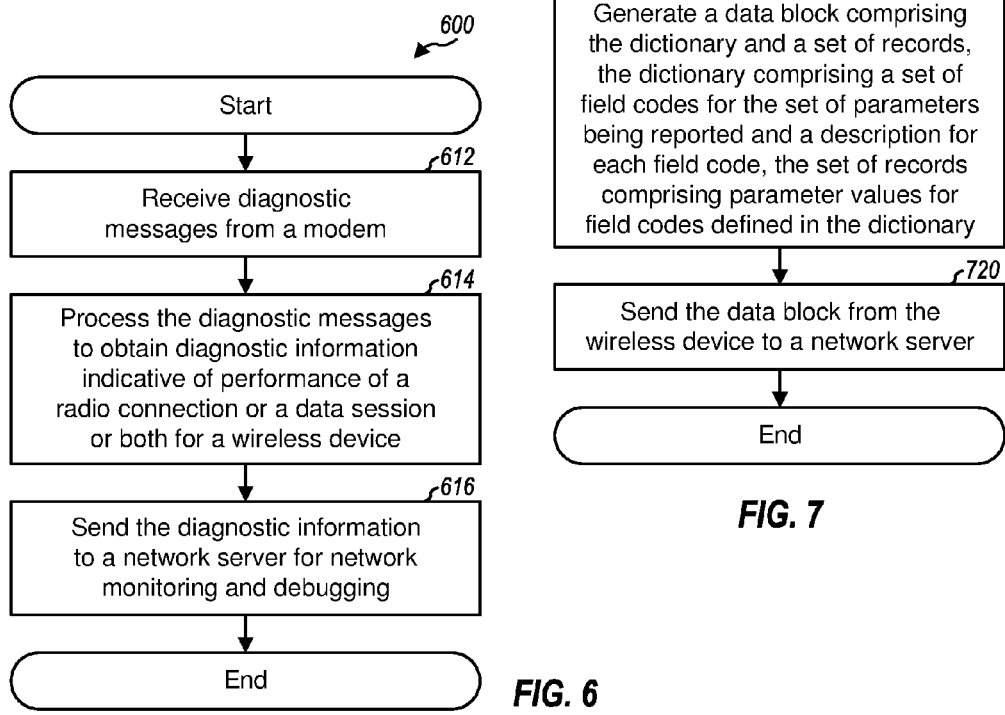
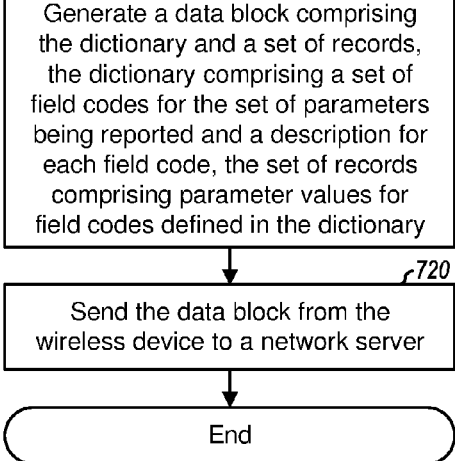

MODE SWITCHING USER DEVICE

CROSS REFERENCE TO RELATED APPLICATIONS

The present application is a continuation of U.S. Non-Provisional application Ser. No. 12/272,994 entitled "DIAGNOSTIC MONITORING BY A WIRELESS DEVICE" filed Nov. 18, 2008, which claims priority to provisional U.S. Application Ser. No. 60/989,050, entitled "MODE SWITCHING USER DEVICE," filed Nov. 19, 2007.

BACKGROUND

I. Field

The present disclosure relates generally to communication, and more specifically to techniques for supporting wireless communication for a wireless device.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks. The wireless networks may also be referred to as radio networks, radio access networks, access networks, etc.

A wireless device may be within the coverage of zero, one or multiple radio networks at any given moment. The wireless device may access the most preferred radio network among all available radio networks and may establish a radio connection with this radio network. The wireless device may also establish a data session with a designated network entity. The wireless device may thereafter exchange data via the radio connection for the data session. The radio conditions and/or network conditions may change during the data session and may affect the performance of the wireless device. It is desirable to efficiently monitor the radio and network conditions in order to obtain good service for the wireless device.

SUMMARY

Techniques for monitoring radio conditions and network conditions to improve performance for a wireless device are described herein. In one design, the wireless device may include a diagnostic monitoring module, a modem, and an application. The diagnostic monitoring module may communicate with the modem via a diagnostic interface to receive diagnostic messages indicative of radio and network conditions, data performance of the wireless device, etc. The diagnostic monitoring module may provide pertinent information to the application, which may use the information to make decisions on service activation, network selection, etc.

In one design, the diagnostic monitoring module may receive diagnostic messages from the modem via the diagnostic interface. The module may process the diagnostic messages to obtain network status information indicative of the status of a radio network. The module may parse the diagnostic messages to obtain pertinent parameters for the radio network and may determine the network status information based on these parameters. The module may provide the network status information via a second interface (e.g., APIs) to the application for use by the application to control communication with the radio network.

In another design, the diagnostic monitoring module may process the diagnostic messages to obtain diagnostic information indicative of the performance of a radio connection or a data session or both for the wireless device. The module may parse the diagnostic messages to extract parameters of interest, discard remaining parameters, and store the extracted parameters in a buffer. The module may generate a report comprising a set of parameters stored in the buffer and may send the report to a network server. The report may comprise diagnostic information, which may be used by the network server for network monitoring, debugging, etc.

In yet another design, paging messages may be sent to the wireless device in different manners depending on the operating mode of the wireless device. The wireless device may receive a first paging message sent based on a first identifier (e.g., a Mobile Directory Number (MDN)) for the wireless device when it is operating in an inactive mode. The wireless device may receive a second paging message sent based on a second identifier (e.g., an Internet Protocol (IP) address) for the wireless device when it is operating in an active mode. The IP address may be associated with the MDN and a socket for an application at the wireless device. The second paging message may be sent to the socket for the application.

Various aspects and features of the disclosure are described in further detail below.

BRIEF DESCRIPTION OF THE DRAWINGS

FIG. 5 shows a process for providing information to applications.

FIG. 6 shows a process for reporting diagnostic information.

FIG. 7 shows a process for sending diagnostic information.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as cdma2000, Universal Terrestrial Radio Access (UTRA), etc. cdma2000 covers IS-2000, IS-95 and IS-856 standards. IS-2000 Releases 0 and A are commonly referred to as CDMA2000 1x, 1xRTT, 1x, etc. IS-856 is commonly referred to as High Rate Packet Data (HRPD), CDMA2000 1xEV-DO, 1xEV-DO, EVDO, etc. UTRA includes Wideband CDMA (WCDMA) and other variants of CDMA. A TDMA network may implement a radio technology such as Global System for Mobile Communications (GSM). An OFDMA network may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2). For clarity, certain aspects of the techniques are described below for 1×RTT and EVDO.

Figure 1:
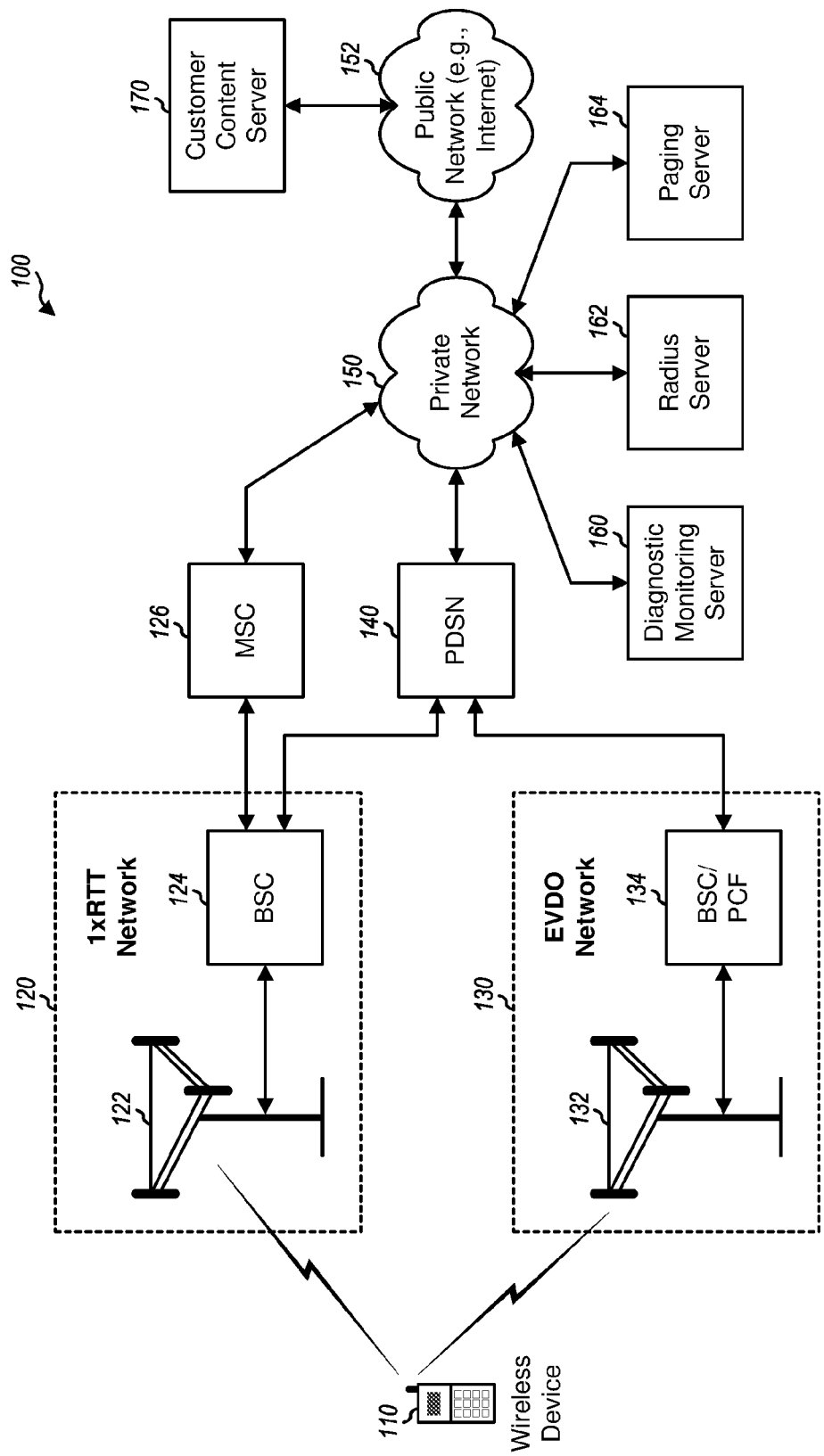
FIG. 1 shows a deployment with two radio networks.

FIG. 1 shows a deployment 100 with a 1×RTT network 120 and an EVDO network 130, which are two radio networks utilizing different radio technologies. 1×RTT network 120 includes base stations that support radio communication for wireless devices located within the coverage of these base stations. Similarly, EVDO network 130 includes base stations that support radio communication for wireless devices located within the coverage of these base stations. For simplicity, only one base station 122 is shown for 1×RTT network 120, and only one base station 132 is shown for EVDO network 130 in FIG. 1. Base stations 122 and 132 may be located at different sites or co-located at the same site. In general, a base station (BS) (1×RTT terminology) is a fixed station that communicates with wireless devices and may also be referred to as an access point (AP) (EVDO terminology), a Node B (3GPP terminology), an evolved Node B (also 3GPP terminology), a base transceiver station (BTS), etc. A base station may provide communication coverage for a particular geographic area. To improve network capacity, the overall coverage area of a base station may be partitioned into multiple (e.g., three) smaller areas. In 3GPP2, the term "sector" can refer to the smallest coverage area of a base station and/or a base station subsystem serving this coverage area. A base station is also referred to as "BS" in the description below.

A wireless device 110 may be stationary or mobile and may also be referred to as a mobile station (MS) (1×RTT terminology), an access terminal (AT) (EVDO terminology), a user equipment (UE) (3GPP terminology), a subscriber unit, a station, etc. Wireless device 110 may be a cellular phone, a personal digital assistant (PDA), a wireless modem, a laptop computer, a wireless local loop (WLL) station, a user device, etc. Wireless device 110 may communicate with a base station on the forward link and/or reverse link. The forward link (or downlink) refers to the communication link from the base station to the wireless device, and the reverse link (or uplink) refers to the communication link from the wireless device to the base station. Wireless device 110 is also referred to as "device", "MS" and "AT" in the description below.

In 1×RTT network 120, a Base Station Controller (BSC) 124 may couple to a set of base stations and provide coordination and control for these base stations. BSC 124 may handle allocation of traffic channels to wireless devices, control handoff of wireless devices, etc. A Mobile Switching Center (MSC) 126 may couple to BSC 124 and support circuit-switched communication for wireless devices. MSC 126 may provide routing for circuit-switched calls and perform mobility management for wireless devices located within the area served by the MSC. wireless devices In EVDO network 130, a BSC/Packet Control Function (PCF) 134 may couple to a set of base stations and control the exchange of packet data between these base stations and a Packet Data Serving Node (PDSN) 140. PDSN 140 may support packet-switched communication for wireless devices communicating with radio networks 120 and 130. PDSN 140 may handle establishment, maintenance, and termination of data sessions for wireless devices. PDSN 140 may couple to a private network 150, which may be owned and operated by a network operator.

A diagnostic monitoring server 160 may couple to private network 150 and support monitoring of radio and network conditions. Server 160 may receive reports describing radio and network conditions observed by wireless devices. Server 160 may support network monitoring and debugging and may provide the status of the radio networks when requested. A Radius server 162 may support authentication, authorization and accounting (AAA) functions for users. Radius server 162 may also store a database of MDN to IP address binding, which may be used to page wireless devices with active data sessions, as described below. A paging server 164 may support paging of wireless devices via 1×RTT network 120 and EVDO network 130. Other servers supporting other functions may also be coupled to private network 150. The servers may also be referred to by other names. Private network 150 may be coupled to a public network 152, which may include the Internet and/or other data networks.

A customer content server 170 may support one or more services that can be subscribed to and obtained by wireless devices. For example, server 170 may provide multi-media services, e.g., download of audio, video, and/or other media content to wireless devices. One such multi-media service may be download of book content as described in the aforementioned provisional U.S. Application Ser. No. 60/989,050.

Wireless device 110 may establish a data session with PDSN 140 and may send and receive data during the data session. The data session may also be referred to as a Point-to-Point Protocol (PPP) session, a data connection, etc. The data session may be valid for any period of time and may be closed by either wireless device 110 or PDSN 140.

Wireless device 110 may or may not have data to send or receive at any given moment during the data session. Wireless device 110 may establish a radio connection with a radio network whenever there is data to send or receive. The radio connection may be referred to as a data call, a data service, etc. Wireless device 110 may be assigned traffic channels for the radio connection and may send and/or receive data via the assigned traffic channels. The radio connection and the traffic channels may be valid for as long as there is data to send or receive and may be released when there is no data activity in order to conserve radio resources.

In one design, wireless device 110 may operate in one of the radio connection states shown in Table 1.

TABLE 1

Radio Connection/Data Call States

| Connection State | Description |
| --- | --- |
| IDLE | MS has no radio connection |
| CONNECTED 1xRTT | MS has radio connection with 1xRTT network |
| CONNECTED EVDO | MS has radio connection with EVDO network |

In one design, wireless device 110 may operate in one of the session states shown in Table 2.

TABLE 2

Session States

| Session State | Description |
|---|---|
| ONLINE | Data session and radio connection are established |
| DORMANT | Data session is established and radio connection is released |
| CLOSED | Data session is closed |
| UNAVAIL | Modem is initializing, and no data session and no radio connection have been established |
| ERROR | Modem failed network attachment |

Figure 2:
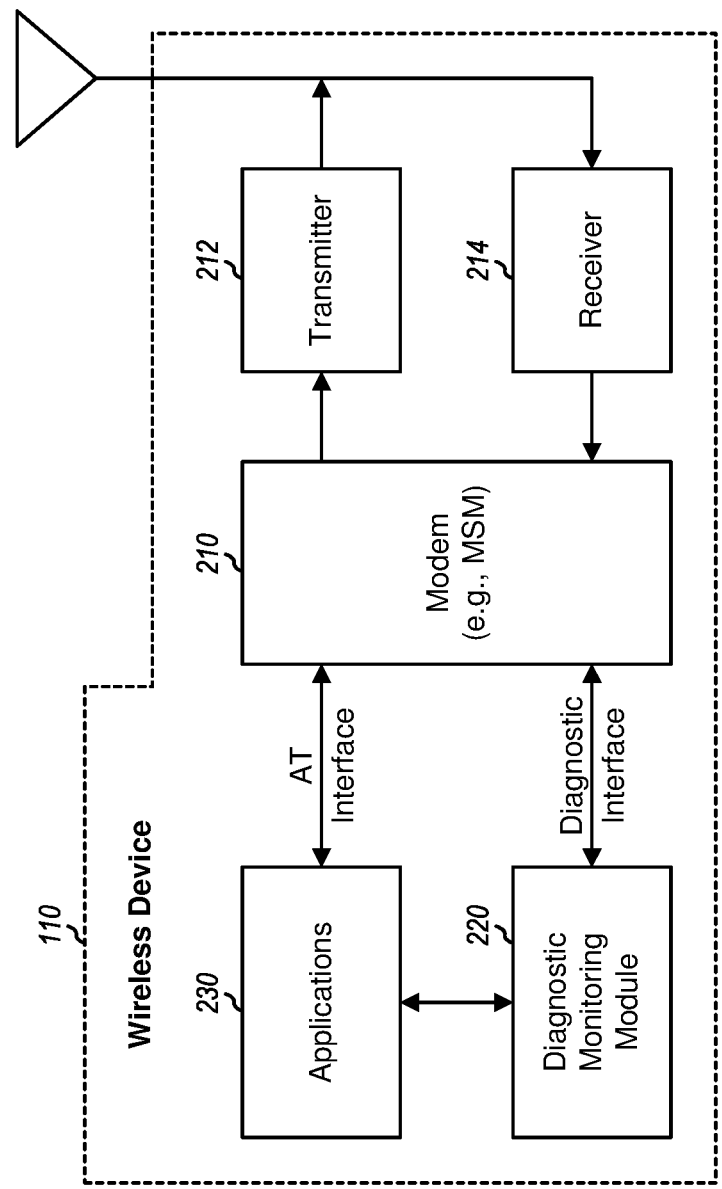
FIG. 2 shows a block diagram of a wireless device.

FIG. 2 shows a block diagram of a design of wireless device 110. In the transmit path, a modem 210 may process (e.g., encode, modulate, spread, and scramble) data and signaling to be sent by wireless device 110 to obtain output samples. A transmitter 212 may condition (e.g., convert to analog, filter, amplify, and frequency upconvert) the output samples to generate a reverse link signal, which may be transmitted to one or more base stations. In the receive path, forward link signals from the base stations may be received and provided to a receiver 214. Receiver 214 may condition (e.g., filter, amplify, frequency downconvert, and digitize) the received signal to obtain input samples. Modem 210 may process (e.g., descramble, despread, demodulate, and decode) the input samples to obtain decoded data and signaling sent to wireless device 110. Modem 210 may perform processing in accordance with the radio technology (e.g., 1xRTT or EVDO) used by the radio network currently serving wireless device 110. In one design, modem 210 may be implemented with a Mobile Station Modem (MSM) from Qualcomm Incorporated, Inc.

Applications 230 may include various applications such as a multi-media application, an email application, a web browser application, a location services application, etc. An application may communicate with a network entity in order to provide a service requested by a user. For example, a multi-media application may communicate with customer content server 170 to download media (e.g., book content) to wireless device 110 for display to the user. Applications 230 may communicate with modem 210 by exchanging AT commands via an AT interface, which is commonly used for modems.

An application may desire to establish a data call with a radio network in order to provide a service requested by the user. The application may exchange AT commands with modem 210 to establish a data call. The AT commands may support operations such as dialing, hanging up, and changing parameters of the data call. The AT commands may provide the application with limited information regarding the network conditions, e.g., which radio networks are available. The application may attempt to establish a data call with different radio networks until a successful data call is established. The application may thereafter communicate with a network entity (e.g., customer content server 170) via the established data call. The AT commands may not be available once the data call is established. An escape sequence may be performed to interrupt the data call and allow for exchanges of AT commands. However, this interrupt may be disruptive to the service being provided to the user. In any case, the application may have limited visibility on network conditions and device performance.

In an aspect, a diagnostic monitoring module 220 may communicate with modem 210 via a diagnostic interface to receive diagnostic messages indicative of radio and network conditions, data performance of wireless device 110, etc. Diagnostic monitoring module 220 may also communicate with applications 230 to receive requests from the applications and to provide pertinent information to the applications. The applications may use the information to make decisions on service activation and network selection, to control communication with the selected radio network, etc. Diagnostic monitoring module 220 may perform various functions and provide various types of information, as described below.

Diagnostic monitoring module 220 may collect various parameters from modem 210. These parameters may be for quality-of-service (QoS) metrics encompassing user experience and network performance. The QoS metrics may be used to determine whether QoS issues exist and whether the QoS issues are related to a radio connection (i.e., radio network issues) or a data connection (i.e., data connectivity issues). Module 220 may process the parameters to obtain various types of information that may be useful to applications 230, diagnostic monitoring server 160, customer content server 170, and/or other entities. In one design, module 220 may collect and provide the types of information listed in Table 3.

TABLE 3

Types of Information

| Information Type | Description |
|---|---|
| Network status information | Information related to radio networks |
| Device status information | Information related to MS |
| Data connectivity information | Information related to a data session for MS |
| Diagnostic information | Information related to status of a radio connection and a data session for MS |

The network status information may comprise received signal strength, detected radio networks, etc. The device status information may comprise identifiers for wireless device 110, information on items configured for wireless device 110, etc. The data connectivity information may comprise data connection status, data performance metrics, etc. The diagnostic information may comprise information related to a radio connection and/or a data session for wireless device 110. These different types of information are described in further detail below.

Figure 3:
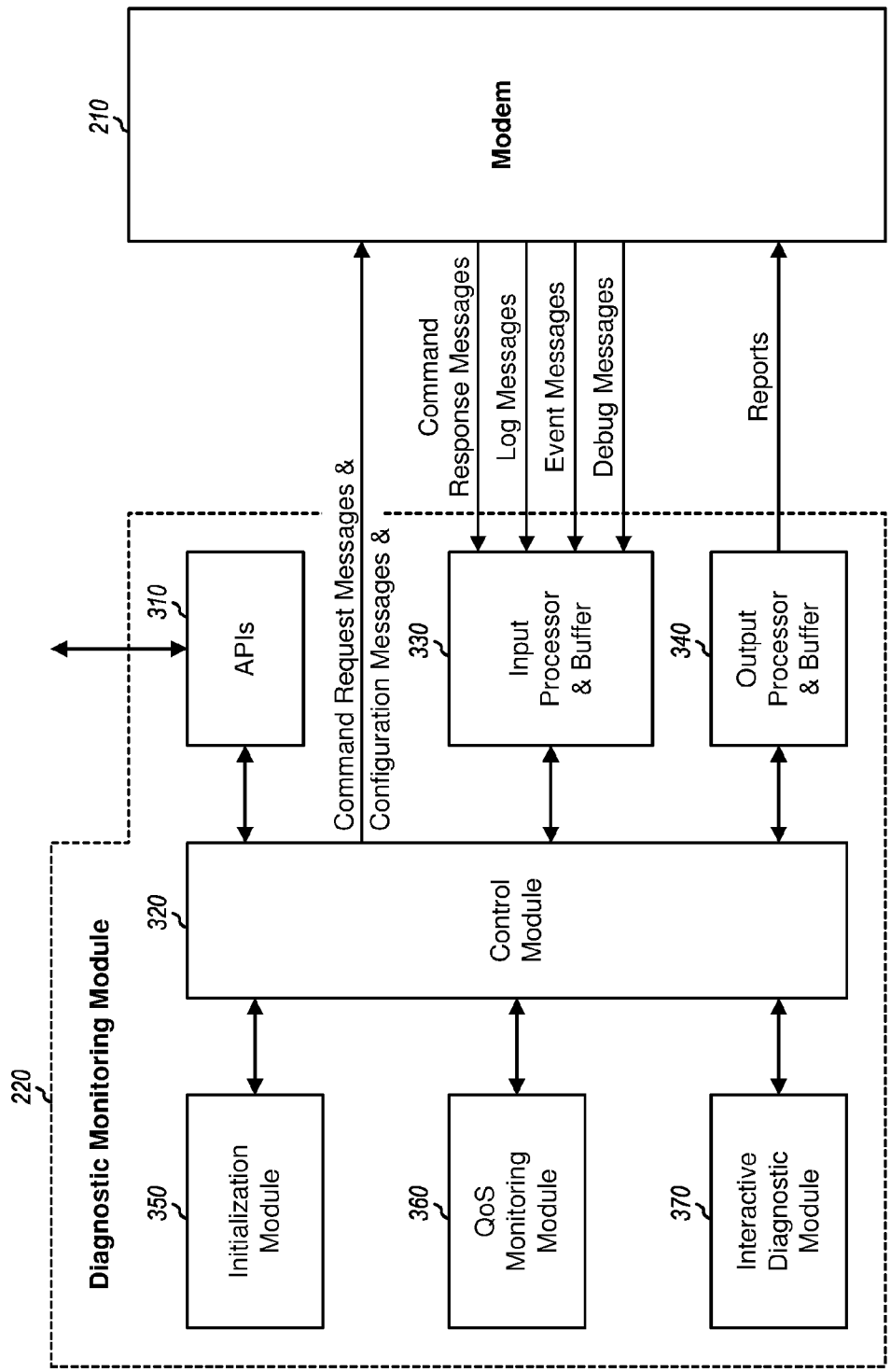
FIG. 3 shows a block diagram of a diagnostic monitoring module.

FIG. 3 shows a block diagram of a design of diagnostic monitoring module 220 in FIG. 2. Diagnostic monitoring module 220 may communicate with applications 210 via Application Programming Interfaces (APIs) 310. A control module 320 may control the operation of various modules within diagnostic monitoring module 220. Control module 320 may receive requests from applications 230 via APIs 310, process the requests, and provide information to the applications.

Control module 320 may send configuration messages to modem 210 to configure modem 210 to report certain parameters periodically and/or when triggered by events. Control module 320 may also send command request messages to modem 210 to ask for specific parameters. As used herein, the term "parameter" generically refers to any piece of information, which may be static or dynamic. Modem 210 may provide diagnostic messages such as command response messages, log messages, event messages, and debug messages, which may be as described in Table 4.

TABLE 4

Diagnostic Messages

| Message Type | Description |
| --- | --- |
| Command response messages | Messages sent in response to command request messages |
| Log messages | Messages sent periodically |
| Event messages | Messages sent when triggered by events |
| Debug messages | Messages sent in a streaming manner to assist debug and trouble shooting. |

The different types of messages in Table 4 may be characterized by how they are sent and possibly what is sent in the messages. The command request messages from diagnostic monitoring module 220 and the command response messages from modem 210 may operate in a trigger/response manner. A command request message may ask for a specific parameter, and a command response message may provide the requested parameter. A command request message may also direct modem 210 to perform a specific action, and a command response message may confirm completion of the action. For example, a command request message may invoke an item write to provision modem 210 with activation parameters for normal operation.

Log messages may be sent periodically and may provide designated parameters. The reporting of log messages may be configured by a configuration message, which may be referred to as a log mask. Different log messages may be defined and may be enabled based on the configuration of the log mask. Each log message may be associated with a specific bit of the log mask and may be enabled by setting the associated bit in the log mask to a predetermined value (e.g., '1'). Each log message may provide a specific set of parameters based on a reporting schedule applicable for that log message. Modem 210 may provide log messages in a periodic manner to diagnostic monitoring module 220.

Event messages may be sent when triggered by events and may be enabled by a configuration message. Each event message may provide a specific set of parameters when triggered by a specific event, which may be expiration of a timer, a parameter value crossing a threshold, etc. Modem 210 may provide event messages in an asynchronous manner as events occur.

Debug messages may be streamed from various modules within modem 210 into a file during normal operation. Debug messages may be used to collect/create a debug log as an aid for troubleshooting.

In general, modem 210 may provide a given parameter in any message. Certain parameters may be more suitably provided by certain types of message. For example, command request messages may be used to retrieve static or semi-static parameters. Log messages may be used to provide parameters that can change dynamically. Event messages may be used to provide parameters that may be pertinent when there are changes in the operation of wireless device 110, the radio connection, the data session, etc. A given parameter may also be provided in different types of message, e.g., in a log message as well as an event message. The different types of messages are described in further detail below.

An input processor and buffer 330 may receive command response messages, log messages, event messages, and debug messages from modem 210. Processor 330 may process the received messages to collect parameters of interest and may store the collected parameters in an input buffer. Processor 330 may provide the collected parameters to control module 320 and/or other modules when requested. An output processor and buffer 340 may receive reports from control module 320 and may buffer the reports until they are ready to be sent. Processor 340 may provide the reports to modem 210 for transmission to diagnostic monitoring server 160 in FIG. 1 and/or other network entities.

An initialization module 350 may receive parameters from input processor 330 and may process the parameters to determine network status information. Module 350 may monitor system determination and network access status of radio networks. Module 350 may receive requests for specific information from applications 230 and may provide the requested information. For example, an application may invoke a GetBars API. In response, module 350 may obtain pilot measurements for sectors in an active set (ASET) of wireless device 110, translate the pilot measurements to a bar value (e.g., 0 to 5 bars) indicative of the received signal strength of the radio network, and provide the bar value to the application. As another example, the application may invoke a GetRBI API. In response, module 350 may determine whether wireless device 110 is communicating with a preferred or non-preferred radio network and may provide a roaming bit indicator (RBI) as defined in a Preferred Roaming List (PRL) for the radio network. The application may also request for other types of information, e.g., system time, local time offset. etc. Module 350 may obtain the requested information and provide it to the application. The application may use the bar value, the RBI, and/or other information from module 350 to determine whether or not to activate a service and initiate a data call, to select a radio network on which to initiate the data call, etc.

A QoS monitoring module 360 may receive log messages and event messages from modem 210 and may process these messages to determine the status and/or performance of a data call. In one design, module 360 may be activated during an active window and disabled outside of the active window. Module 360 may detect for origination of the data call, which may be the start of the active window. Module 360 may also detect for release of the data call, which may be the end of the active window. Module may monitor radio performance and data performance during the active window, e.g., as background task. In another design, module 360 may operate whenever activated, e.g., by control module 320.

Module 360 may parse (e.g., in real-time) the log messages and event messages received from modem 210 to obtain different parameters for the radio connection, the data session, etc. Module 360 may group the different parameters and store them in the input buffer. Module 360 may detect for trigger conditions, which may include dropped call, PPP failure, call termination, failure to establish radio connection, failure to establish data connection, failure to acquire radio frequency (RF) lock or channel assignment, loss of sync channel or paging channel, etc. The trigger conditions typically denote abnormal conditions for wireless device 110. Whenever a trigger condition is detected, module 360 may collect parameters that are stored in the input buffer and associated with the trigger condition to obtain a snapshot of the current radio and network conditions. Module 360 may generate a report containing pertinent parameters for the trigger condition and may forward the report to processor 340 for transmission to diagnostic monitoring server 160 and/or other network entities.

In general, diagnostic monitoring module 220 may send reports due to various trigger conditions, which may cover different types of failures and abnormal conditions. The reports may be used for various purposes such as trouble shooting, network monitoring, etc. For example, an application may encounter a failure that is captured by a trigger condition, and a report may be sent for the trigger condition. The user may call the network operator to report the failure, and the network operator may have information from the report to diagnose the cause of the failure. The network operator may also use the reports to monitor the performance of the radio network, to detect for error or overloading conditions, etc. The network operator may then take appropriate corrective actions.

An interactive diagnostic module 370 may support debug and diagnostic of a data call and a data session for wireless device 110. Module 370 may be invoked by the user, the network operator, a content provider, etc. When invoked, module 370 may present a debug/diagnostic screen on wireless device 110. The debug/diagnostic screen may provide radio parameters for the radio connection. Module 370 may obtain the radio parameters from among the parameters stored in the input buffer and may update these radio parameters on the screen as new log messages and event messages are received from modem 210. The user may navigate through the screen to view different radio parameters. The user may also capture the radio parameters on the screen (e.g., by hitting an "S" button) and may save the radio parameters to a file for export to diagnostic monitoring server 160. Module 370 may also use the radio parameters to determine network status, network access failures, etc.

Module 370 may also collect parameters for the data session and may provide data connectivity information as an aid for debugging, etc. The data connectivity information may indicate whether wireless device 110 is on-line or dormant, whether there is a data connection failure, etc. The data connectivity information may provide Mobile IP (MIP) authentication status, data connection status, etc. The data connection status may identify data connection issues and may provide a timestamp and an error code for localized identification of a data connection issue.

Module 370 may also capture information for various events affecting the operation of wireless device 110. Module 370 may capture information for a MIP event, e.g., a registration reply (RRP) code and a timestamp. Module 370 may capture information for a paging event, e.g., a timestamp of an incoming page, the location (e.g., latitude and longitude) of a base station sending the page, a local time offset of the geographic location, etc. Module 370 may capture information for an authentication event, e.g., failure condition for rejection of service by Radius server 162, Registration Reply Code (RRC), timestamp of failed authentication, etc. Module 370 may capture information on an event that may block an application from establishing a data call. The information may indicate whether the application is denied access due to (i) no service or out-of-range condition or (ii) roaming condition on an unauthorized radio network. The information may comprise parameters such as a PRL provisioned on wireless device 110, a System Identification (SID), a Network Identification (NID), a base station identification (BaseID), latitude and longitude of the base station, a color code, a sector ID, etc. Module 370 may also capture information on rejection of access by wireless device 110, e.g., due to an incorrect Mobile Station ID (MSID), a network rejection, etc. In general, module 370 may present captured information for any event on a debug/diagnostic screen and/or may send the capture information to diagnostic monitoring server 160.

Wireless device 110 may perform authentication with 1×RTT network 120 or EVDO network 130 during establishment of a data call. Diagnostic monitoring module 220 may keep track of the status of the authentication process. The status may be "OK" if modem access credentials (e.g., ESN and MSID) have passed authentication to a designated network entity, e.g., a Home Location Registry (HLR) or a Home Authentication, Authorization and Accounting (H-AAA). The status may be "FAIL" if wireless device 110 has failed authentication, e.g., due to mismatch in the modem access credentials. Module 220 may store information regarding the authentication process and may provide the information to facilitate debugging of data connectivity issues.

Wireless device 110 may utilize MIP for a data session and may perform registration for MIP. Diagnostic monitoring module 220 may keep track of the status of the MIP registration process. Module 220 may store information regarding the MIP registration process and may provide the information to facilitate debugging of data connectivity issues.

Diagnostic monitoring module 220 may support a set of APIs that may be invoked by applications 230 to retrieve pertinent information. In general, any set of APIs may be supported, and each API may provide any information. In one design, the supported APIs may include all or a subset of the APIs shown in Table 5.

TABLE 5

APIs

| API | Description |
|---|---|
| GetESN | Provide Electronics Serial Number (ESN) of MS |
| GetMDN | Provide Mobile Directory Number (MDN) of MS |
| GetIMSI | Provide International Mobile Subscriber Identity (IMSI) of MS |
| GetOpMode | Provide current operational mode of MS |
| GetSysTime | Provide system time received from BS |
| GetRSSI | Provide received signal strength indicator (RSSI) |
| GetBars | Provide a bar value (e.g., 0 to 5) for received signal strength |
| GetRoamingStatus | Provide current roaming status of MS |
| GetIncomingCount | Provide current total count of incoming calls |
| GetPRLVersion | Provide version of PRL provisioned in MS |
| EnableQoSMonitoring | Enable QoS monitoring by diagnostic monitoring module |
| GetQoSData | Provide QoS-related parameters obtained from modem |
| GetQoSReport | Provide QoS report in human readable format |
| OriginateCallTest | Originate a test call and return result of the test |
| SetMode | Set mode of modem to online or offline |
| GetActiveProfile | Provide index of active MIP user profile |
| GetActiveProfileNAI | Provide Network Access Identifier (NAI) of MIP user profile |
| GetActiveProfileHSS | Provide Home Agent (HA) shared secret for MIP user profile |
| GetActiveProfileASS | Provide H-AAA shared secret for MIP user profile |
| GetActiveProfileHSPI | Provide HA secret parameter index for MIP user profile |
| GetActiveProfileASPI | Provide H-AAA secret parameter index for MIP user profile |
| GetActiveProfileHA | Provide HA address for MIP user profile |
| GetActiveProfilePHA | Provide primary HA address for MIP user profile |
| GetActiveProfileSHA | Provide secondary HA address for MIP user profile |
| Flashdata | Provide capability of upgrading modem firmware |

Diagnostic monitoring module 220 may also support APIs to set MDN, IMSI, parameters for the active MIP user profile, etc. Module 220 may also support different and/or additional APIs.

As described above, modem 210 may send different types of messages containing different parameters. In general, any set of messages may be supported for each message type, and each message may carry one or more parameters. For clarity, exemplary sets of command response messages, log messages, and event messages are given below.

In one design, modem 210 may return command response messages for command request messages received from diagnostic monitoring module 220. There may be a one-to-one mapping between a command request message and a corresponding command response message. In one design, the supported command response messages may include all or a subset of the messages shown in Table 6.

In one design, modem 210 may periodically send log messages containing various parameters. Each log message may provide a set of parameters applicable for that log message. For example, a log message for airlink summary may provide a measured pilot energy, a pilot pseudo-random number (PN), etc. In one design, the supported log messages may include all or a subset of the messages shown in Table 7.

TABLE 7

Log Messages

| | Log Message | Description |
|---|---|---|
| L1 | Sync channel message | Provide system time and local time offset |
| L2 | General paging message | Provide terminal phone home (TPH) page detection |
| L3 | System parameter message | Provide base station ID and location |
| L4 | 1xRTT throughput | Provide throughput for 1xRTT network |
| L5 | 1xRTT airlink - active | Provide 1xRTT received signal quality in active mode |
| L6 | 1xRTT airlink - idle | Provide 1xRTT received signal quality in idle mode |
| L7 | EVDO airlink summary | Provide EVDO received signal quality |
| L8 | EVDO connection attempt | Provide EVDO traffic channel acquisition status |
| L9 | EVDO throughput | Provide throughput for EVDO network |
| L10 | EVDO protocol state | Provide MS state, session state, etc. |
| L11 | EVDO sleep info | Provide EVDO received signal quality in sleep/idle mode |
| L12 | PPP info | Provide MIP RRP network response codes |
| L13 | EVDO debug display | Provide debug screen parameters for EVDO state |
| L14 | EVDO connection termination info | Provide information on past EVDO connection terminations |
| L15 | EVDO connected state protocol info | Provide total EVDO users and messages in sector |
| L16 | Call event | Provide information on origination, connect or end call status, and call event supporting detail |
| L17 | Call type | Provide information on call type, e.g., packet-switched, circuit-switched, SMS, voice, etc. |
| L18 | Call end status | Provide information on anomalous call termination |
| L19 | Call session | Provide indication of 1xRTT or EVDO call session |
| L20 | Forward link channel traffic message | Provide information for forward channel traffic messages |
| L21 | EV-DO signaling control channel broadcast | Log signaling messages transmitted on forward channels with broadcast addressing mechanism |
| L22 | EV-DO state | Provide state information for modules in MS |

TABLE 6

Command Response Messages

| Command Response Message | Description |
|---|---|
| C1 Version number | Provide information on MS firmware version and BS protocol revision (P_Rev) version |
| C2 ESN | Provide ESN of MS |
| C3 Status | Provide various parameters for MS and radio network, e.g., SID, NID, RF mode, etc. |
| C4 Call end | Terminate a data call in progress |
| C5 NV item read | Provide requested non-volatile (NV) items |
| C6 PRL read | Provide PRL provisioned on MS |
| C7 Status snapshot | Provide information on supported and in-use P_Rev and band class |
| C8 RLP statistics reset | Reset Radio Link Protocol (RLP) operating statistics, e.g., for parameters indicative of performance of radio network |
| C9 NV item write | Support provisioning of activation parameters |

Diagnostic monitoring module 220 may send configuration messages to modem 210 to configure the log messages. The configuration messages may specify which log messages are enabled, the conditions in which each log message should be sent by modem 210, the frequency of each log message, which parameters should be sent for each log message, etc. Modem 210 may send the log messages as configured by diagnostic monitoring module 220.

In one design, modem 210 may send event messages containing various parameters when triggered by events. Each event message may provide a set of parameters applicable for that event message. In one design, the supported event messages may include all or a subset of the messages shown in Table 8.

TABLE 8

Event Messages

| Event Message | Description | Report |
|---|---|---|
| MIP RRP regn denied | MIP authentication failed | A |
| Dropped call - RF fade | Data call was dropped due to RF fade | A |
| Failed pilot acquisition | Modem failed to acquire pilot after T20 | A |
| Lost sync channel | Sync channel message not received after T21 | A |
| Lost paging channel | Paging channel message not received after T30 | A |
| Failed handoff attempt | Handoff failed after T72 | A |
| Failed paging channel during access attempt | Paging channel message not received after T40 m during access attempt | A |
| Overhead info timeout | Overhead message not received on paging channel after T41 | A |
| No L3 Ack for probe | L3 Ack not received for access probe after T42 | A |
| Poor frame count | Poor frame count during Traffic Ch Init state | A |
| No BS Ack | No base station Ack during Traffic Ch Init state | A |
| No BS confirm order | BS confirm order not received after T64 | A |
| No service connect | Service connect message not received after T65 | A |
| No service message | Service request, response, or connect message not received after T68 | A |
| No PDU Ack | Ack not received for protocol data unit (PDU) | A, B |
| No mini PDU Ack | Ack not received for mini PDU | A, B |
| Call end - no service | No service available for MS | A, C |
| Call end - RF fade | Call end abnormally | A, C |
| Call end - orig intercept | Receive origination intercept from BS | D |
| Call end - orig reorder | Receive origination reorder from BS | D |
| Call end - no reason | Receive release from BS with no reason given | D |
| Call end - SO reject | Receive release from BS with SO rejected | D |
| Call end - incoming call | Receive incoming call from BS | D |
| Call end - alert stop | Receive alert stop from BS | D |
| Call end - aborted | MS aborted origination/conversation | A |
| Call end - max probes | Maximum number of access probes transmitted | A, C |
| Call end - access failure | Access failure for reason other than above | A, C |
| Call end - retry order | Receive origination retry order | D |
| Call end - no response | Receive no response from BS | A |
| Call end - rejected | Call rejected by BS | D |
| Call end - blocked | Access is blocked by BS | C, D |
| Call end - active | Call originated when another call is active | D |
| Call end - BS killed | Call ended by BS due to emergency call | D |
| Call end - MS killed | Call ended by MS due to emergency call | D |
| Call end - rejected | Call is rejected during handoff or redirection | A, C |
| Call end - not pref PRL | Call ended due to redirection or PRL not preferred | E |
| Call end - no PPP | Call ended due to no PPP session | E |
| Call end - setup timeout | Call ended due to connection setup timeout | B |
| Call end - for 1xRTT | EVDO call ended so that 1xRTT call can continue | E |
| Call end - no hybrid ser | MS has no hybrid EVDO service | E |
| Call end - no RF lock | RF locked not obtained | B |
| Connection deny | Connection attempt denied for general reason | E |
| Network busy | Connection attempt denied due to busy network | E |
| Billing failure | Connection attempt denied for billing reason | E |
| Authentication failure | Authentication failed | E |
| Power down | Connection terminated due to power down | |
| Offline | Connection terminated due to offline | |
| Application blocking | Application blocked call | |

Different timer values may be used for different event messages and are denoted as Txx in Table 8, where "xx" is a timer index. Each timer value may be any suitable value and may be specified by standards.

Diagnostic monitoring module 220 may send configuration messages to modem 210 to configure the event messages. The configuration messages may specify which event messages are enabled, the conditions in which each event message should be sent by modem 210, which parameters should be sent for each event message, etc. Modem 210 may send the event messages as configured by diagnostic monitoring module 220.

Diagnostic monitoring module 220 may generate reports whenever certain trigger conditions occur, e.g., when certain event messages are received from modem 210. The last column of Table 8 lists the report(s) that may be generated for each event message. Table 9 lists a set of parameters that may be sent in each of reports A through E and provides the source of each parameter. RX0 denotes a primary receiver and RX1 denotes a diversity receiver at wireless device 110.

TABLE 9

Reports

| Source | Parameter |
|---|---|
| Report A - 1xRTT RF | |
| L5 | RX0 AGC |
| L5 | RX1 AGC |
| L5 | Ec/Io |
| L5 | TX power |
| L5 | TX gain adjust |
| L5 | TX power limit |
| L5 | Pilot base |
| L5 | Current channel |
| L5 | Band class |
| L3 | BaseID |

TABLE 9-continued

Reports

| Source | Parameter |
|---|---|
| C7 | P_Rev in use |
| C3 | SID |
| C3 | NID |
| Report B - EVDO RF | |
| L13 | RX0 AGC |
| L13 | RX1 AGC |
| L13 | TX AGC |
| L13 | Serving PN |
| L13 | Channel |
| L13 | UATI info |
| L13 | SectorID |
| L13 | Color code |
| L7 | SINR |
| L7 | DRC |
| L7 | Pilot PN ASP |
| L3 | BaseID |
| C7 | P_Rev in use |
| C3 | SID |
| C3 | NID |
| L3 | BS latitude |
| L3 | BS longitude |
| Report C - Config Status | |
| C2 | ESN |
| C1 | Version num info |
| C6 | PRL version |
| Report D - 1xRTT Network Status | |
| L5 | Pilot base |
| L5 | Current channel |
| L5 | Band class |
| L3 | BaseID |
| C7 | P_Rev in use |
| C3 | SID |
| C3 | NID |
| Report E - EVDO Network Status | |
| L13 | Serving PN |
| L13 | SectorID |
| L13 | Color code |
| L3 | BaseID |
| C7 | P_Rev in use |
| C3 | SID |
| C3 | NID |

Other reports may also be generated in response to the trigger conditions. For example, a 1×RTT throughput report may contain parameters for a data call with 1×RTT network 120, an EVDO throughput report may contain parameters for a data call with EVDO network 130, an EVDO connection attempt report may contain parameters for connection attempts in EVDO network 130, an EVDO connection termination report may contain parameters for connection terminations in EVDO network 130, an EVDO connection status report may contain parameters for connection statistics, and a device parameter report may contain parameters for wireless device 110.

Diagnostic monitoring module 220 may generate reports whenever failure events or abnormal conditions are detected. Module 220 may also periodically generate reports, e.g., for network performance or device performance.

Diagnostic monitoring module 220 may send the generated reports to diagnostic monitoring server 160 or some other network entity. The reports may be sent when they are generated or at a later time, e.g., if a radio connection or a data session is not established. Diagnostic monitoring server 160 may use the reports for network monitoring, debugging, etc.

In one design, a lightweight reporting protocol may be used to send the reports from wireless device 110 to diagnostic monitoring server 160 or some other network entity. A dictionary may be dynamically defined for events and parameters to be report by wireless device 110. Each event may be assigned a different event code. Each parameter may also be assigned a different field code. A report may then include values for parameters given by the associated field codes. The use of the lightweight reporting protocol may reduce the amount of data to send for reports.

In one design, wireless device 110 may send a session start message to diagnostic monitoring server 160 to start a reporting session. The session start message may serve as a handshake between wireless device 110 and diagnostic monitoring server 160 and may also be used by server 160 to control or throttle reporting by wireless device 110. Server 160 may either accept or reject the reporting session and may return a session reply message to wireless device 110. If the reporting session is accepted, then wireless device 110 may send a data block for one or more reports, which may be generated by wireless device 110 using the dictionary. If the reporting session is rejected, then wireless device 110 may either (i) discard the reports that have been queued for transmission, e.g., automatically or if instructed by server 160, or (ii) attempt to send the reports at a later time. The reports may be discarded to avoid transmission of duplicate reports for the same network error by different wireless devices in the same geographic area.

In one design, the session start message may comprise the fields shown in Table 10. In the following description, "0xV . . . V" denotes a hexadecimal value of V . . . V, where each V may be a hex value between 0 and F.

TABLE 10

Session Start Message

| Field | Name | Value | Description |
|---|---|---|---|
| 1 | Type | 0x0 | Predefined value for session start message |
| 2 | Length | variable | Size of the session start message (in bytes) |
| 3 | Version | | Reporting protocol version number |
| 4 | MDN | 10 digits | 10-digit MDN of MS |
| 5 | Latitude | signed decimal | Latitude of a point, with precision up to 6 decimals. Set to 0 if location is not available. |
| 6 | Longitude | signed decimal | Longitude of the point, with precision up to 6 decimals. Set to 0 if location is not available. |
| 7 | MIP Code | 0xVV | 1-byte MIP code for MS |
| 8 | Base ID | 0xVVVV | 2-byte base station ID |
| 9 | Event ID | integer | ID of event to be reported in reporting session |

In one design, the session reply message may comprise the fields shown in Table 11.

TABLE 11

Session Reply Message

| Field | Name | Value | Description |
|---|---|---|---|
| 1 | Type | 0x1 | Predefined value for session reply message |
| 2 | Response | 0x0 | Reporting session rejected |
| | | 0xFF | Reporting session accepted |

In one design, a data block may be sent in the reporting session and may comprise a dictionary and a set of one or more records. The dictionary may comprise definitions of field codes for parameters contained in the records. The dictionary may be given by a sequence of field code definitions. Each field code definition may have the form {event code}·{field code}={field code description}. For example, a field code definition may be 99.1=RX0 AGC, where '99' is an event code, '1' is a field code, and "RX0 AGC" is a parameter for the field.

Each record may include a set of fields for an associated event. Each record may have the format given in Table 12. An Event Type field may comprise one or more field code/value pairs of the form {field code}={field value}. The field code may be interpreted based on the field code definition given in the dictionary. For example, the Event Type field may include 1=58, where '1' may refer to RX0 AGC and '58' may refer to an AGC value of 58. In one design, the data block may comprise the fields shown in Table 12.

TABLE 12

Data Block

| Field | Name | Value | Description |
|---|---|---|---|
| 1 | Type | 0x2 | Predefined value for data block |
| 2 | Size | variable | Size of the data block (in bytes) |
| Dictionary |
| One or more records, each record having the following format: |
| 1 | Event | 0xVV | Code of event |
| 2 | Event Type | event code | One or more field code/value pairs for the event |
| 3 | Event Time | | Time of the event |
| 4 | Latitude | | Latitude of the event. Set to 0 if unavailable. |
| 5 | Longitude | | Longitude of the event. Set to 0 if unavailable. |

In the design shown in Table 12, a dictionary may be dynamically defined for a reporting session and may be conveyed in a data block. The dictionary may be tailored for the events and parameters reported in the data block. In another design, a dictionary may be predefined and known a priori by wireless device 110 as well as diagnostic monitoring server 160 and does not need to be conveyed in the data block. In yet another design, a set of dictionaries may be predefined and assigned unique dictionary IDs. The data block may then convey the dictionary ID of the specific dictionary to use for the data block. The dictionary may also be defined and conveyed in other manners.

Diagnostic monitoring server 160 may terminate a reporting session by sending a session stop message. The session stop message may indicate whether the reporting session is successfully closed or has failed, e.g., if the data connection is dropped for whatever reason before the reporting session can be closed. In one design, the session stop message may comprise the fields shown in Table 13.

TABLE 13

Session Stop Message

| Field | Name | Value | Description |
|---|---|---|---|
| 1 | Type | 0x4 | Predefined value for session stop message |
| 2 | Length | variable | Size of the session stop message (in bytes) |
| 3 | Response | 0x0 | Reporting session successfully closed |
| | | 0x1 | Reporting session has failed |

TABLE 13-continued

Session Stop Message

| Field | Name | Value | Description |
|---|---|---|---|
| 4 | Size Received | variable | Size of the received data block (in bytes). |

Wireless device 110 may decide how to handle an improperly closed reporting session. If the reporting session is rejected by diagnostic monitoring server 160, then wireless device 110 may discard all data that has been queued for transmission or may initiate another reporting session, e.g., after waiting some amount of time. Wireless device 110 may make a decision based on the amount of resources needed to send reports to diagnostic monitoring server 160.

A specific design of various messages and a data block for reporting diagnostic information has been described above. Diagnostic information may also be reported using other messages, which may include different and/or additional fields.

Diagnostic monitoring module 220 may provide a debug/diagnostic screen, e.g., when invoked by the user. The debug/diagnostic screen may provide various parameters for wireless device 110, the radio connection, the data session, the application, etc. In one design, the debug/diagnostic screen may provide all or a subset of the parameters shown in Table 14.

TABLE 14

Parameters for Debug/Diagnostic Screen

Device Parameters

ESN
MDN
MSID
Modem firmware version
Slot cycle index
MSM version
PRL version

Network Parameters

P_Rev of BS
Current P_Rev
SID
NID
BaseID
BS latitude
BS longitude

Application Parameters

Version of module 220
RSSI signal bars
RBI
Network signal
System time

1xRTT Network

Phone state
Band class
RF channel
PN offset
Ec/Io
RX0 AGC
RX1 AGC
TX power
TX gain adjust
TX power limit Modem Activity RF mode
Paging status TABLE 14-continued Parameters for Debug/Diagnostic Screen WAN Access Radio network
HLR
Network authentication
MIP RRP
Radio connection state
Session state EVDO Network MS state
Session state
Search state
Band class
RF channel
PN offset
Data rate request (DRC)
SINR
Active set pilot energy
RX0 AGC
RX1 AGC
RX diversity
TX power
SectorID
Color code
BS latitude
BS longitude Referring back to FIG. 1, wireless device 110 may communicate with 1×RTT network 120 or EVDO network 130 at any given moment. Wireless device 110 may operate in different manners for different radio networks.

Figure 4:
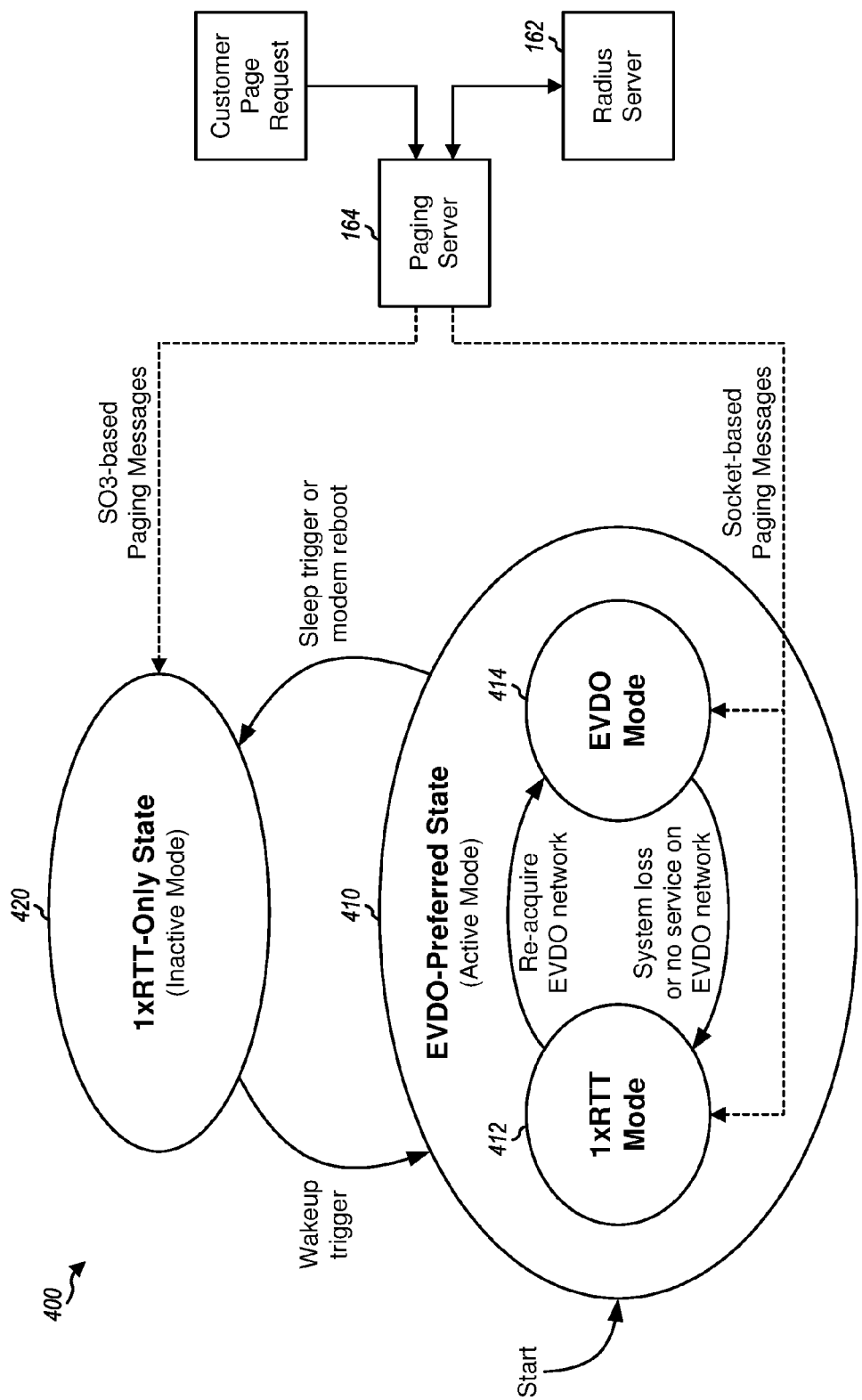
FIG. 4 shows a diagram of operating states and modes of the wireless device.

FIG. 4 shows a state diagram 400 of operating states and modes of wireless device 110 in accordance with one design. At power up, wireless device 110 may transition to an EVDO-preferred state 410, and diagnostic monitoring module 220 may be enabled. In EVDO-preferred state 410, wireless device 110 may perform system determination to determine which radio networks are available. Wireless device 110 may operate in (i) a 1×RTT mode 412 if only 1×RTT network 120 is available or (ii) an EVDO mode 414 if EVDO network 130 is available. While in EVDO mode 414, wireless device 110 may transition to 1×RTT mode 412 if system loss or no service is encountered for EVDO network 130. While in 1×RTT mode 412, wireless device 110 may periodically attempt to re-acquire EVDO network 130 and may transition back to EVDO mode 414 if EVDO network 130 is re-acquired.

Wireless device 110 may operate in EVDO-preferred state 410 while in an active mode and may operate in an 1×RTT-only state 420 while in an inactive mode. The inactive mode may also be referred to as a sleep mode, an idle mode, etc. Wireless device 110 may enter the inactive mode and transition from EVDO-preferred state 410 to 1×RTT-only state 420 if there is a sleep trigger or if modem 210 is reboot. The sleep trigger may occur due to a period of no user activity or some other condition. In the inactive mode, much of wireless device 110 and diagnostic monitoring module 220 may be powered down in order to conserve battery power. While in 1×RTT-only state 420, modem 210 may listen for paging messages from 1×RTT network 120. Wireless device 110 may transition from 1×RTT-only state 420 to EVDO-preferred state 410 when a wakeup trigger is received. The wakeup trigger may be due to reception of a paging message for wireless device 110, origination of a data call, or some other condition. Diagnostic monitoring module 220 may be enabled upon transitioning to EVDO-preferred state 410.

In one design, wireless device 110 may be paged via different mechanisms for the active and inactive modes. Wireless device 110 may be paged via 1×RTT network 120 or EVDO network 130 in the active mode and via 1×RTT network 120 in the inactive mode.

In one design, wireless device 110 may be paged based on a voice service option (e.g., Service Option 3 (SO3)) via 1×RTT network 120 while operating in the inactive mode. Wireless device 110 may register with 1×RTT network 120 and may update its location with 1×RTT network 120 as wireless device 110 moves about. Wireless device 110 may also be assigned specific paging slots, which are time periods in which paging messages can be sent to wireless device 110. 1×RTT network 120 may send a paging message to wireless device 110 during an assigned paging slot and based on the current location of wireless device 110. The paging message may be sent to wireless device 110 using an MDN, which is a phone number for wireless device 110. Wireless device 110 may be ringed for a sufficiently long duration in order to assure multiple page notifications. Wireless device 110 may avoid answering a paging message sent using SO3 and may instead use this message as a trigger to originate a packet data call, e.g., with Service Option 33 (SO33) call back.

While in 1×RTT-only state 420, wireless device 110 may power down as much circuitry as possible and may wake up periodically during its assigned paging slots. Wireless device 110 may process the paging channel from 1×RTT network 120 in each assigned paging slot to determine whether a paging message has been sent for wireless device 110. If a paging message is received and a response is needed, then wireless device 110 may transition to EVDO-preferred state 410.

In one design, wireless device 110 may be paged based on its IP address while operating in the active mode. Upon acquiring a radio network, wireless device 110 may establish a data session (e.g., a PPP session) with PDSN 140. Wireless device 110 may acquire an IP address during data session establishment (e.g., from a Home Agent after successful MIP authentication) and may use this IP address for the duration of the data session. The IP address may be associated with (i.e., linked to) the MDN of wireless device 110 as well as a socket for an application at wireless device 110. A socket is one endpoint of a two-way communication path between an application at one entity and an application at another entity. A socket may be bound to a port number so that transport layer protocols such as TCP can identify the application mapped to the socket. The association between IP address, MDN, and socket may be stored in a binding table in a database by Radius server 162 (as assumed in much of the description below) or by some other network entity. Radius server 162 may receive framed IP attribute as well as (i) a session start record that indicates that a data session for wireless device 110 has begun and that the IP address is valid and (ii) a session stop record that indicates that the data session is closed.

A network entity (e.g., customer content server 170) may desire to page wireless device 110 and may invoke a network API interface to ring the MDN of wireless device 110. A lookup in the binding table may be performed to determine if the MDN has an active IP address assigned to it. If an active IP address is assigned, then a notification packet may be sent to a specific port where a TCP server (or TCP listener) is running on wireless device 110. When the TCP listener detects the notification packet, an application may be notified. The application may then establish a mobile originated packet data call to the network entity. However, if a valid IP address is not assigned to the MDN, then a voice page (SO3) may be sent to the MDN of wireless device 110.

A socket-based paging message may thus be sent to wireless device 110 by determining the IP address of wireless device 110, determining the MDN and socket linked to the IP address, and sending a paging message (e.g., a notification packet) to the socket using the MDN. Wireless device 110 may receive the paging message and may process the paging message by detecting a payload string for content match. If there is a match, then an application is notified of the page, and a TCP listener may send an acknowledgement payload back to paging server 164 to complete the handshake. Both entities may then close their sockets after the exchange.

Paging server 164 may receive a paging message for wireless device 110 and may determine whether wireless device 110 is operating in the active mode or the inactive mode. Paging server 164 may send the paging message using SO3-based paging if wireless device 110 is operating in the inactive mode or using socket-based paging if wireless device 110 is operating in the active mode. Wireless device 110 may power down its protocol stack during the inactive mode and may not be able to receive socket-based paging messages during the inactive mode.

FIG. 5 shows a design of a process 500 for providing information to applications. Process 500 may be performed by a module such as diagnostic monitoring module 220 at a wireless device. The module may receive diagnostic messages from a modem via a first interface, e.g., a diagnostic interface used by the modem to provide parameters for testing functionalities of the modem (block 512). The module may process the diagnostic messages to obtain network status information indicative of the status of a radio network (block 514). The module may provide the network status information via a second interface (e.g., APIs) to an application for use by the application to control communication with the radio network (block 516). For example, the application may use the network status information to determine whether to activate a service, to select a radio network for the service if activated, etc.

In one design of block 514, the module may parse the diagnostic messages to obtain designated parameters for the radio network and may determine the network status information based on these parameters. The network status information may comprise a bar value indicative of the received signal strength for the radio network, an RBI, an indication of the radio technology of the radio network, system time, etc.

The module may also process the diagnostic messages to obtain device status information indicative of the status of the wireless device. The device status information may comprise an ESN, an MDN, a modem version, a PRL version, and/or other information for the wireless device. The module may provide the device status information via the second interface to the application.

The module may send at least one configuration message to the modem to configure the modem to send log messages. The configuration message(s) may define specific log messages to send, parameters to send in the log messages, conditions for sending the log messages, etc. The module may thereafter receive log messages sent by the modem as configured by the configuration message(s). The module may send a command request message for at least one parameter to the modem and may receive a command response message with the at least one parameter. The module may receive from the application an API requesting a parameter for network status information and may provide the requested parameter to the application.

FIG. 6 shows a design of a process 600 for reporting diagnostic information by a wireless device. Process 600 may be performed by a module such as diagnostic monitoring module 220. The module may receive diagnostic messages from a modem (block 612). The module may process the diagnostic messages to obtain diagnostic information indicative of performance of a radio connection or a data session or both for the wireless device (block 614). The module may send the diagnostic information to a network server for network monitoring, debugging, etc. (block 616).

The module may send at least one configuration message to the modem to configure the modem to send log messages. The configuration message(s) may define parameters to send in the log messages and conditions for sending the log messages. The module may receive log messages sent by the modem as configured by the configuration message(s).

The module may send at least one configuration message to the modem to configure the modem to send event messages. The configuration message(s) may define specific event messages to send, parameters to send in the event messages, conditions for sending the event messages, etc. Each event message may be sent when triggered by an associated event and may provide a set of parameters defined for that event message. The module may receive the event messages sent by the modem as configured by the configuration message(s).

In one design of block 614, the module may parse the diagnostic messages to obtain designated parameters and discard remaining parameters in the diagnostic messages. The module may store the designated parameters in a buffer. In one design of block 616, the module may generate a report comprising a set of parameters stored in the buffer. The set of parameters may form the diagnostic information. The module may send the report to the network server.

FIG. 7 shows a design of a process 700 for sending diagnostic information by a wireless device. Process 700 may be performed by a module such as diagnostic monitoring module 220. The module may receive diagnostic messages from a modem (block 712). The module may process the diagnostic messages to obtain a set parameters indicative of the performance of a radio connection or a data session or both for the wireless device (block 714). The module may define a dictionary based on the set of parameters to report and may assign a different field code to each parameter in the set (block 716). The module may generate a data block comprising the dictionary and a set of records (block 718). The dictionary may comprise a set of field codes for the set of parameters being reported and a description for each field code. The set of records may comprise parameter values for field codes defined in the dictionary. The module may send the data block from the wireless device to a network server (block 720).

In one design, the module may send a start message to initiate a reporting session with the network server. The module may receive from the network server a reply message accepting the reporting session. The module may generate and send the data block during the reporting session.

Figures 8, 9:
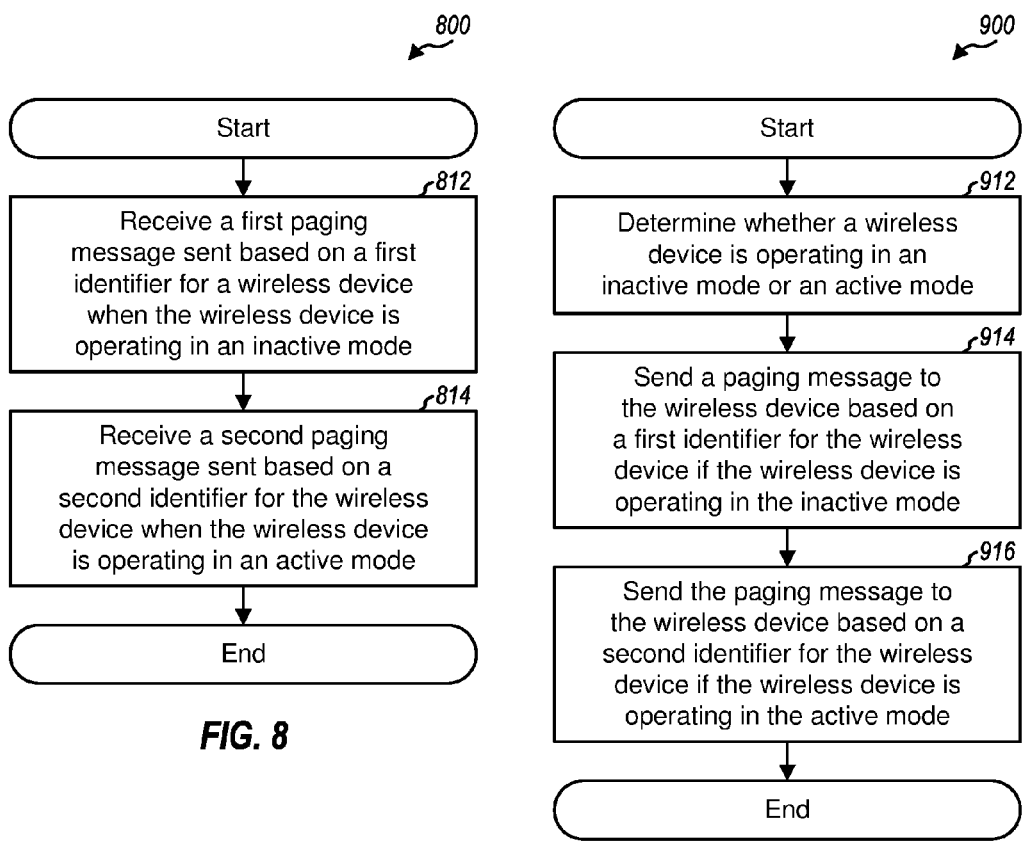
FIG. 8 shows a process for receiving paging messages at the wireless device.
FIG. 9 shows a process for sending paging messages to the wireless device.

FIG. 8 shows a design of a process 800 for receiving paging messages at a wireless device. The wireless device may receive a first paging message sent based on a first identifier for the wireless device when it is operating in an inactive mode (block 812). The wireless device may receive a second paging message sent based on a second identifier for the wireless device when it is operating in an active mode (block 814). The wireless device may have an active data session in the active mode and may not have an active data session in the inactive mode.

The first identifier may comprise an MDN for the wireless device, and the first paging message may be sent using a voice service option (e.g., SO-3) to the wireless device. The second identifier may comprise an IP address for the wireless device, and the second paging message may be sent to a socket for an application at the wireless device. The wireless device may receive the first paging message via a first radio network, e.g., a 1xRTT network. The wireless device may receive the second paging message via the first radio network or a second radio network, e.g., an EVDO network.

FIG. 9 shows a design of a process 900 for sending paging messages. Process 900 may be performed by a network entity such as paging server 164 in FIGS. 1 and 4. The paging server may determine whether a wireless device is operating in an inactive mode or an active mode (block 912). The paging server may send a paging message to the wireless device based on a first identifier for the wireless device if it is operating in the inactive mode (block 914). The paging server may send the paging message to the wireless device based on a second identifier for the wireless device if it is operating in the active mode (block 916).

The first identifier may comprise an MDN for the wireless device, and the first paging message may be sent using a voice service option to the wireless device. The second identifier may comprise an IP address for the wireless device, and the second paging message may be sent to a socket for an application at the wireless device. The paging server, a Radius server, or another network entity may store an association of the IP address, the socket, and the MDN for the wireless device.

Figure 10:
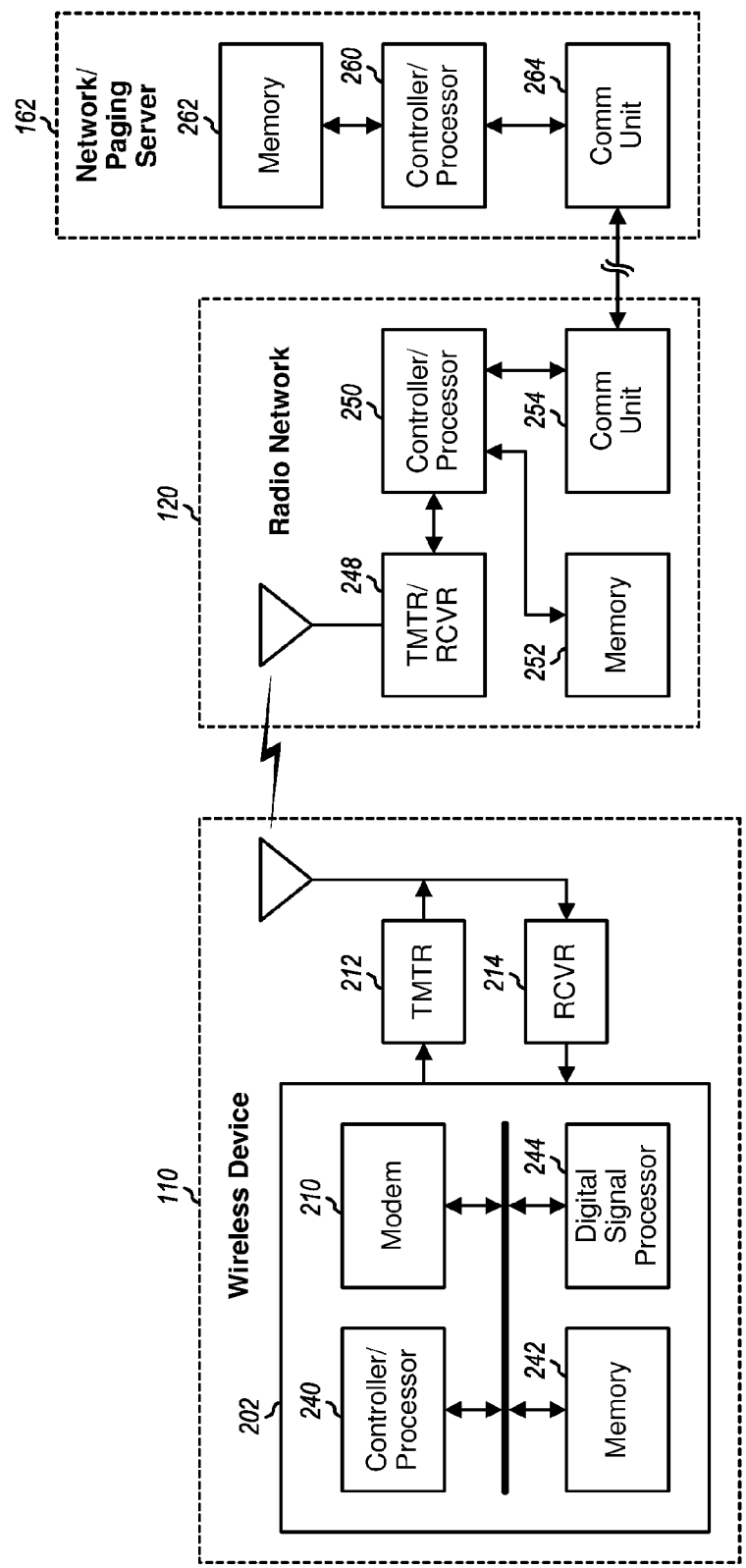
FIG. 10 shows a block diagram of the wireless device, a radio network, and a network server.

FIG. 10 shows a block diagram of a design of wireless device 110, radio network 120, and network/paging server 162 in FIG. 1. At wireless device 110, modem 210 may receive data to be sent by the wireless device, process the data, and generate output samples. Transmitter (TMTR) 212 may condition the output samples and generate a reverse link signal, which may be transmitted to radio network 120. On the forward link, wireless device 110 may receive forward link signals from radio network 120 and/or other radio networks. Receiver (RCVR) 214 may condition the received signal and provide input samples. Modem 210 may process the input samples and provide decoded data. Modem 210 may perform processing in accordance with a radio technology (e.g., 1xRTT, EVDO, etc.) utilized by the radio network serving wireless device 110. A digital signal processor 244 may perform various types of processing for wireless device 110.

A controller/processor 240 may direct the operation at wireless device 110. Processor 240 and/or 244 may implement modules 320 to 370 in FIG. 3. Processor 240 and/or 244 may also perform or direct process 500 in FIG. 5, process 600 in FIG. 6, process 700 in FIG. 7, process 800 in FIG. 8, and/or other processes for the techniques described herein. A memory 242 may store program codes and data for wireless device 110. Modem 210, processors 240 and 244, and memory 242 may be implemented on an application specific integrated circuit (ASIC) 202.

At radio network 120, transmitter/receiver 248 may support radio communication with wireless device 120 and other wireless devices. A controller/processor 250 may perform various functions for communication with the wireless devices. A memory 252 may store program codes and data for radio network 120. A communication (Comm) unit 254 may support communication with other network entities, e.g., network server 162. In general, radio network 120 may include any number of controllers, processors, memories, transmitters, receivers, communication units, etc.

At network server 162, a controller/processor 260 may perform various functions to support communication services, e.g., paging. Controller/processor 260 may perform or direct process 900 in FIG. 9 and/or other processes for the techniques described herein. A memory 262 may store program codes and data for network server 162. A communication unit 264 may support communication with other network entities, e.g., radio network 120, PDSN 140, etc. In general, network server 162 as well as other servers in FIG. 1 may be implemented with any number of controllers, processors, memories, communication units, etc.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining, by a network server, whether a wireless mobile device is operating in a sleep mode or an active mode;
   sending a first paging message to the wireless mobile device based on a first identifier of the wireless mobile device in response to a determination that the wireless mobile device is operating in the sleep mode, wherein the first identifier comprises a unique Mobile Directory Number (MDN) of the wireless mobile device; and
   sending a second paging message to the wireless mobile device based on a second identifier of the wireless mobile device in response to a determination that the wireless mobile device is operating in the active mode, wherein the second identifier comprises an Internet Protocol (IP) address of the wireless mobile device.

2. The method of claim 1, wherein the sending of the paging messages is initiated at a content server by invoking an application programming interface (API), and wherein the network server is a paging server.

3. The method of claim 1, wherein whether the wireless mobile device is operating in the sleep mode or the active mode is determined by performing a lookup in a binding table.

4. The method of claim 3, further comprising:
   storing an association of a Mobile Directory Number (MDN), an Internet Protocol (IP) address and a socket for an application of the wireless mobile device in the binding table.

5. The method of claim 4, wherein the binding table is stored in a database at a Remote Authentication Dial-In User Service (RADIUS) server.

6. The method of claim 1, wherein the first paging message is sent using a voice service option to the wireless mobile device.

7. The method of claim 1, wherein the second paging message is sent to a socket for an application at the wireless mobile device.

8. An apparatus for wireless communication, comprising:
   means for determining whether a wireless mobile device is operating in a sleep mode or an active mode;
   means for sending a first paging message to the wireless mobile device based on a first identifier of the wireless mobile device in response to a determination that the wireless mobile device is operating in the sleep mode, wherein the first identifier comprises a unique Mobile Directory Number (MDN) of the wireless mobile device; and
   means for sending a second paging message to the wireless mobile device based on a second identifier of the wireless mobile device in response to a determination that the wireless mobile device is operating in the active mode, wherein the second identifier comprises an Internet Protocol (IP) address of the wireless mobile device.

9. The apparatus of claim 8, wherein the sending of the paging messages is initiated at a content server by invoking an application programming interface (API), and wherein the network server is a paging server.

10. The apparatus of claim 8, wherein whether the wireless mobile device is operating in the sleep mode or the active mode is determined by performing a lookup in a binding table.

11. The apparatus of claim 10, further comprising:
    means for storing an association of a Mobile Directory Number (MDN), an Internet Protocol (IP) address and a socket for an application of the wireless mobile device in the binding table.

12. The apparatus of claim 8, wherein the first paging message is sent using a voice service option to the wireless mobile device.

13. The apparatus of claim 8, wherein the second paging message is sent to a socket for an application at the wireless mobile device.

14. An apparatus for wireless communication, comprising:
    a memory; and
    at least one processor coupled to the memory, the at least one processor configured to:
       determine whether a wireless mobile device is operating in a sleep mode or an active mode;
       send a first paging message to the wireless mobile device based on a first identifier of the wireless mobile device in response to a determination that the wireless mobile device is operating in the sleep mode, wherein the first identifier comprises a unique Mobile Directory Number (MDN) of the wireless mobile device; and send a second paging message to the wireless mobile device based on a second identifier of the wireless mobile device in response to a determination that the wireless mobile device is operating in the active mode, wherein the second identifier comprises an Internet Protocol (IP) address of the wireless mobile device.

15. The apparatus of claim 14, wherein the at least one processor of the network server is configured to initiate sending of the paging messages at a content server by invoking an application programming interface (API), and wherein the network server is a paging server.

16. The apparatus of claim 14, wherein the at least one processor of the network server is configured to determine whether the wireless mobile device is operating in the sleep mode or the active mode by performing a lookup in a binding table.

17. The apparatus of claim 16, wherein the at least one processor of the network server is further configured to store an association of a Mobile Directory Number (MDN), an Internet Protocol (IP) address and a socket for an application of the wireless mobile device in the binding table.

18. The apparatus of claim 17, wherein the at least one processor of the network server is further configured to store the binding table in a database at a Remote Authentication Dial-In User Service (RADIUS) server.

19. The apparatus of claim 14, wherein the first paging message is sent using a voice service option to the wireless mobile device.

20. The apparatus of claim 14, wherein the second paging message is sent to a socket for an application at the wireless mobile device.

* * * * *